US009971173B2

(12) United States Patent
Manouvrier (10) Patent No.: US 9,971,173 B2
(45) Date of Patent: May 15, 2018

(54) PINNED DYNAMIC ELECTRO-OPTICAL PHASE SHIFTER (71) Applicant: STMICROELECTRONICS SA, Montrouge (FR)

(72) Inventor: Jean-Robert Manouvrier, Echirolles (FR)

(73) Assignee: STMICROELECTRONICS SA, Montrouge (FR)

( * ) Notice: Subject to any disclaimer, the term of this patent is extended or adjusted under 35 U.S.C. 154(b) by 4 days.

(21) Appl. No.: 15/251,236

(22) Filed: Aug. 30, 2016

(65) Prior Publication Data

US 2016/0370610 A1    Dec. 22, 2016

Related U.S. Application Data (62) Division of application No. 14/638,345, filed on Mar. 4, 2015, now Pat. No. 9,454,023.

(30) Foreign Application Priority Data

May 22, 2014    (FR) ...................... 14 54613

(51) Int. Cl.
*G02F 1/035* (2006.01)
*G02F 1/295* (2006.01)
*G02B 6/12* (2006.01)
*G02F 1/025* (2006.01)
*G02F 1/01* (2006.01)
*G02F 1/225* (2006.01)

(52) U.S. Cl.
CPC ............ *G02F 1/025* (2013.01); *G02F 1/0123* (2013.01); *G02F 1/225* (2013.01); *G02F 1/2255* (2013.01)

(58) Field of Classification Search
CPC .. G02F 1/025; G02F 2001/212; G02F 1/2255; G02F 1/225; G02F 1/2257; G02F 1/017; G02F 1/0316; G02F 1/01
USPC .......................................... 385/1–3, 8, 14, 40
See application file for complete search history.

(56) References Cited

U.S. PATENT DOCUMENTS

| 4,958,898 | A | 9/1990 | Friedman et al. |
| 7,085,443 | B1 * | 8/2006 | Gunn, III ................ G02F 1/025 |
| | | | 359/245 |
| 7,711,212 | B2 | 5/2010 | Green et al. |
| 2009/0080826 | A1 | 3/2009 | Green et al. |
| 2009/0310901 | A1 | 12/2009 | Dong |

(Continued)

OTHER PUBLICATIONS

Chuang et al, "Silicon Electro-Optic Modulator Fabricated on Silicon Substrate Utilizing the Three-Terminal Transistor Waveguide Structure," Japanese Journal of Applied Physics, vol. 47, No. 4, 2008, Japan, pp. 2945-2949. (See priority U.S. Appl. No. 14/638,345, filed Mar. 4, 2015).

*Primary Examiner* — Kaveh C Kianni
*Assistant Examiner* — Hung Lam
(74) *Attorney, Agent, or Firm* — Slater Matsil, LLP (57) ABSTRACT A semiconductor electro-optical phase shifter may include a substrate, an optical waveguide segment (12) formed on the substrate, and first and second zones of opposite conductivity types configured to form a first bipolar junction perpendicular to the substrate. The phase shifter may also include a dynamic control structure configured to reverse bias the first junction and a static control structure configured to direct a quiescent current in the second zone, parallel to the first junction.

30 Claims, 3 Drawing Sheets (56) References Cited

U.S. PATENT DOCUMENTS

2014/0355925 A1\* 12/2014 Manouvrier ............ G02F 1/025
                                                                                           385/3

\* cited by examiner

PINNED DYNAMIC ELECTRO-OPTICAL PHASE SHIFTER

CROSS REFERENCE TO RELATED APPLICATIONS

This application is a divisional application of pending U.S. Patent Publication No. 2015/0338687 published Nov. 26, 2015, which claims priority to French Application No. FR1454613 filed May 22, 2014, all of which are hereby incorporated herein in their entireties by reference.

TECHNICAL FIELD

The invention relates to semiconductor optical modulators, in particular, to electro-optical phase shifters used in such modulators.

BACKGROUND

Figure 1:
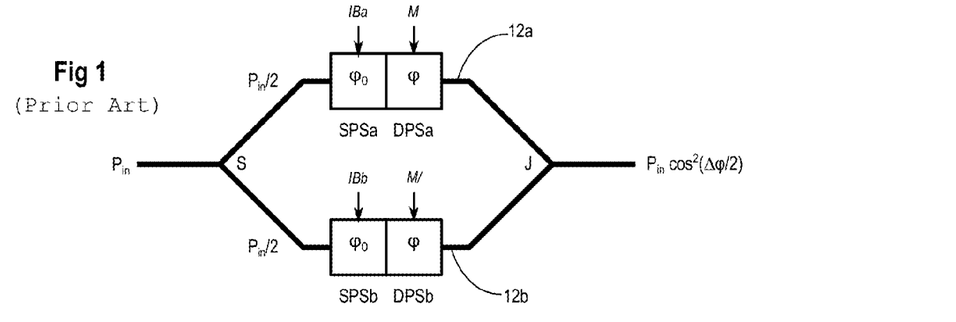
FIG. 1 is a schematic diagram of an optical modulator configured as a Mach-Zehnder interferometer (MZI) in accordance with the prior art.

FIG. 1 schematically shows an optical modulator according to the Mach-Zehnder interferometer principle, commonly referred to as an MZI modulator. The modulator includes an optical waveguide receiving a power Pin, which is divided into two branches 12a and 12b at a point S. The two branches come together again at a point J. Each branch carries half of the original optical power.

Each branch comprises a static electro-optical phase shifter SPS (SPSa and SPSb) and a dynamic electro-optical phase shifter DPS (DPSa and DPSb). The static phase shifters SPS are used to define an initial phase difference φ0 between the two optical waveguide branches. They are controlled by respective bias signals IBa and IBb. The dynamic phase shifters DPS are used to perform a differential modulation around the initial conditions defined by the SPS phase shifters. They are controlled by respective modulation signals M and M/ varying in phase opposition.

The waves arriving on both branches of the modulator are added at point J. The resulting wave has a power of Pin·cos 2(Δφ/2), neglecting the optical losses, where Δφ is the instantaneous phase difference between the waves of the two branches.

Figure 2:
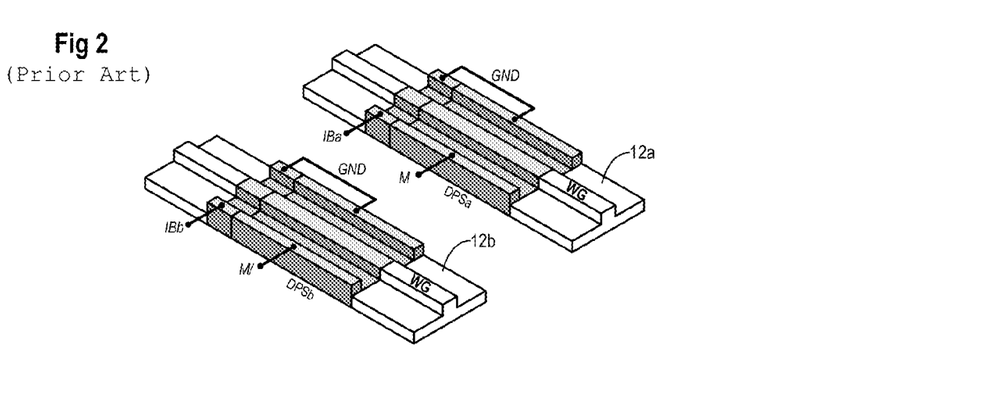
FIG. 2 is a perspective view of two arms of the modulator of FIG. 1.

FIG. 2 is a perspective view of the waveguide branches 12a and 12b incorporating phase shifters SPS and DPS, shown in gray. As shown, the waveguides are formed in transparent islands of intrinsic semiconductor material, having an inverted "T" cross section with a central rib WG that conveys the optical beam. The phase shifters are configured to replace waveguide segments and have the same inverted "T" cross section. The edges of the phase-shifters bear electrical contacts for controlling the phase-shifters—the edges generally rise above the plane of the waveguides, as shown, to reach the device metal levels.

Figure 3A:
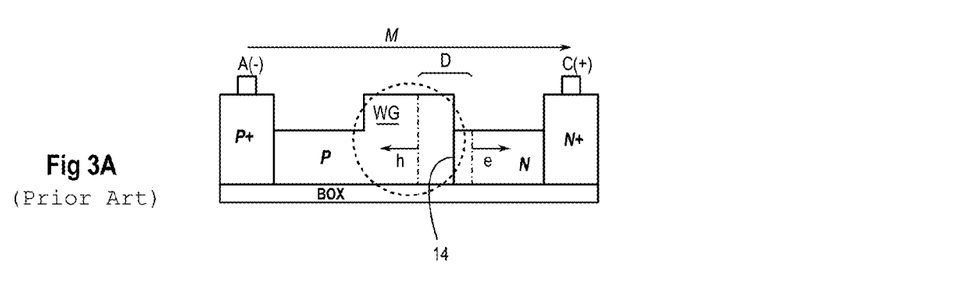
FIGS. 3A and 3B are schematic cross section views of two types of phase shifters used in the modulator of FIG. 1 in accordance with the prior art.

FIG. 3A is a schematic sectional view of a DPS phase shifter referred to as a High-Speed Phase Modulator (HSPM). The cross section plane is perpendicular to the axis of the optical waveguide. A dashed circle, at the center of rib WG, represents the area of concentration of the optical beam.

The phase shifter comprises a semiconductor structure of the same nature as that of the waveguide, generally silicon, forming a PN junction 14 in a plane parallel to the axis of the waveguide, and offset with respect to the axis. The junction 14 is shown, as an example, at the right lateral face of the rib WG.

To the left of the junction 14 extends a P-doped zone that has a cross section conforming to the cross section of the waveguide, comprising an elevated portion at the level of the rib WG, and a lower lateral wing toward the left edge. Zone P ends at its left by a P+ doped raised area, bearing an anode contact A.

To the right of junction 14 extends an N-doped wing conforming to the cross section of the waveguide. The wing ends to the right by an N+ doped raised area, bearing a cathode contact C. The structure of the phase shifter may be formed on an insulating substrate, for example a buried oxide layer BOX.

To control the phase shifter of FIG. 3, a voltage is applied between the anode and cathode contacts A, C, which reverse-biases the junction 14 (the "plus" on the cathode and the "minus" on the anode). This configuration causes a displacement of electrons e from the N region to the cathode and of holes h from the P region to the anode, and the creation of a depletion region D in the vicinity of the junction 14. By adjusting the amplitude of the bias voltage, the carrier concentration can thus be modified in the zone WG crossed by the optical beam, which results in a corresponding modification of the refractive index of this zone.

Figure 3B:
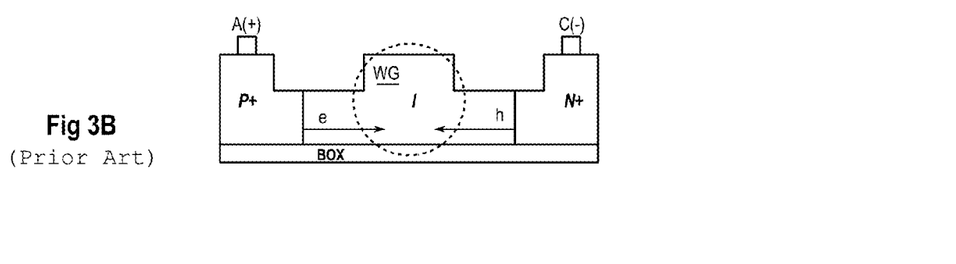

FIG. 3B is a schematic cross section view of a PIN junction phase shifter SPS. The central N and P-doped zones of the structure of FIG. 3A are replaced by a single intrinsic semiconductor zone I, in practice a zone having a floor P-doping level. To control this phase shifter, a current is applied between the anode and cathode contacts A, C, which forward-biases the junction (the "minus" on the cathode and the "plus" on the anode). A current establishes between the anode and the cathode causing the injection of carriers in the intrinsic zone I (holes h from the P+ region to zone I and electrons e from the N+ region to zone I). The carrier concentration, i.e. the refractive index, is thus changed as a function of the current in the area crossed by the optical beam.

PIN phase shifters provide a larger adjustment range per unit of length than HSPM phase shifters, but their response speed is 50 to 100 times slower; that is why they are used in static mode to adjust the quiescent conditions of the modulator. HSPM shifters offer a small response range per unit of length. In practice a PIN phase shifter may introduce a phase delay of 90° over only 250 microns, while an HSPM phase shifter provides a phase shift amplitude of about ten degrees per millimeter. If a phase shift amplitude of 30° is desired, the HSPM phase shifter spans nearly 3 mm. FIG. 2 thus illustrates the HSPM (DPS) phase shifters as being longer than the PIN phase shifters.

SUMMARY

A semiconductor electro-optical phase shifter, generally includes a substrate, an optical waveguide segment formed on the substrate, and first and second zones of opposite conductivity types configured to form a first bipolar junction perpendicular to the substrate. The semiconductor electro-optical phase shifter also includes a dynamic control structure configured to reverse bias the first junction and a static control structure configured to direct a quiescent current parallel to the junction in the second zone.

The phase shifter may comprise a third zone of same conductivity type than the first zone, electrically coupled to the first zone, and forming with the second zone a second bipolar junction parallel to the first junction. The phase shifter may comprise a fourth zone of same conductivity type as the first zone, forming a third bipolar junction perpendicular to the substrate and configured to be forward biased by the static control structure. The first junction may be perpendicular to the axis of the waveguide.

A phase shifter may comprise a plurality of phase shifter modules of the aforementioned type, arranged along a same waveguide, and sharing the control structures.

A phase shifter may comprise a plurality of phase shifter modules of the aforementioned type, arranged along a same waveguide, and having individual control structures configured to produce phase differences in geometric progression.

A method of phase shifting an optical wave may include the steps of providing an optical waveguide in a semiconductor material on a substrate and forming in the waveguide a first bipolar junction perpendicular to the substrate. The method may also include producing a quiescent current flowing parallel to the junction and reverse biasing the junction by a modulation signal.

The method may comprise the steps of forming a second bipolar junction parallel to the first junction, directing the quiescent current between the first and second junctions, and reverse biasing the second junction by the modulation signal. The method may comprise the steps of forming a third bipolar junction perpendicular to the substrate and directing the quiescent current through the third junction.

DESCRIPTION OF EMBODIMENTS

To reduce the length of the dynamic phase shifters of an MZI modulator, phase shifters that can be qualified as "pinned" were explored. U.S. Pat. No. 7,711,212 describes such a phase shifter. The phase shifter is based on a segment of a rib waveguide of P conductivity type, integrally or similar to a PIN diode with a wing of N conductivity type (FIG. 3B). A junction is formed on the upper face of the rib with a cap of N conductivity type. A transverse quiescent current is established in the segment. A voltage applied on the cap that reverses biases the junction creates a depletion region that "pinches" the area through which the transverse current flows. If the voltage on the cap is high enough, the depletion region may completely block the current flow. The waveguide segment is thus used as a JFET transistor.

A pinned phase shifter of the type described in the aforementioned patent is difficult to achieve in practice and does not offer optimal performance. The depletion zone must in particular span the full height of the rib before it starts to pinch the area crossed by the transverse current. The control voltage may then exceed the tolerances allowed by industrial processes.

Figure 4A:
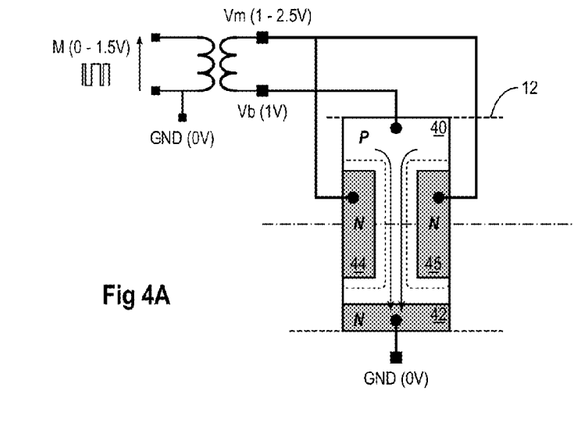
FIGS. 4A and 4B are schematic diagrams of two embodiments of a pinned phase shifter in accordance with the present invention.
Figure 4B:
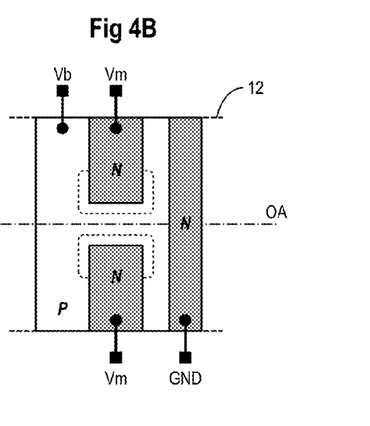

FIGS. 4A and 4B are schematic diagrams of two alternative embodiments of a pinned phase shifter that are relatively straightforward to industrialize, made from a waveguide segment 12. FIGS. 4A, 4B and following are top views of the waveguide. The optical axis of the waveguide is shown by a line OA. The shown structures are vertical, that is to say perpendicular to the substrate on which the waveguide is formed, and may extend over the entire height of the waveguide.

In FIG. 4A, the phase shifter comprises a zone 40 of P conductivity type extending from an edge of the waveguide 12 and stopping between the optical axis OA and the opposite edge of the waveguide. The remaining portion toward the opposite edge is occupied by a zone 42 of N conductivity type. The zones 40 and 42 form a PN junction that is designed to be forward biased by a voltage applied between a ground terminal GND, connected to the zone 42, and a bias terminal Vb connected to the zone 40.

A restrained passage between the terminals Vb and GND is defined in the zone 40 between two transverse zones 44 and 45 of N conductivity type. The N-type zones 44 and 45 define two bipolar junctions with the P-type zone 40 and are connected to a common modulation terminal Vm.

In operation, the terminal Vb receives a constant voltage that defines a quiescent current flowing through the junction 40-42 to ground GND. The phase modulation is performed by a signal applied to terminal Vm. This signal is designed to reverse bias the junctions 44-40 and 45-40, i.e. the voltage level on terminal Vm evolves above the level on terminal Vb.

Under these conditions, a depletion zone is formed, shown by dashed lines, around each of the junctions 44-40 and 45-40, all the wider than the level on terminal Vm is high. The two depletion zones pinch the current path from both sides. This pinching increases the resistivity of the path, resulting in a decrease of the current, and therefore a decrease in the phase delay introduced by the phase shifter. If the voltage level on terminal Vm is sufficiently high, the pinching may be total, and the current cancels.

Voltage levels are provided by way of example in parentheses in FIG. 4A for a gap between areas 44 and 45 of 1 to 2 microns, a length of the zones 44 and 45 of 0.5 to 1 micron, and a doping level of approximately $10^{16}$ atoms per cm$^3$ for the zone 40. The voltage level on terminal GND being 0, the quiescent current establishes at about ten microamperes when applying 1 V to terminal Vb. A modulation amplitude of 1.5 V, corresponding to a peak level of 2.5 V on terminal Vm, may be sufficient to cancel the quiescent current.

If the original modulation signal M is a binary voltage signal referenced to ground GND, evolving between 0 and a positive level (e.g. 1.5V), it may be applied in floating mode between the terminals Vb and Vm, for example using a transformer, as shown. In the frequency range intended for signal M, of the order of several gigahertz, the primary and secondary windings of the transformer may be simple conductor tracks configured in nested loops.

The depletion regions are shown with a constant width throughout the length of the junctions. This would imply that the voltage level in zone 40 remains constant over this length. In practice, the current path being resistive, the voltage level is lower on the side of terminal GND than on the side of terminal Vb. This results in a tapered shape of the depletion regions and a more pronounced pinch on the side of terminal GND.

The length of the zones 44 and 45 has little effect on pinching but determines the capacitance between terminals Vb and Vm. It is desirable to reduce the capacitance to improve the response speed of the phase shifter. It is however desirable that the pinching occurs over the entire width of the optical wave to increase the sensitivity of the phase shifter. Thus, the length of the zones 44 and 45 is preferably of the order of the width of the optical wave.

The use of two parallel reverse biased junctions (44-40, 45-40) doubles the sensitivity of the phase shifter due to the fact that the current path is pinched from both sides. It is possible to use only one junction by replacing one of the zones 44, 45 by an insulating region. This would produce the same operation, but the amplitude of the modulation signal may need to be increased to achieve full pinching.

FIG. 4B is an alternative embodiment of the phase shifter of FIG. 4A. The phase shifter of FIG. 4A has been rotated by 90° about a vertical axis so that the path of the quiescent current is set along the optical axis OA.

Figure 5:
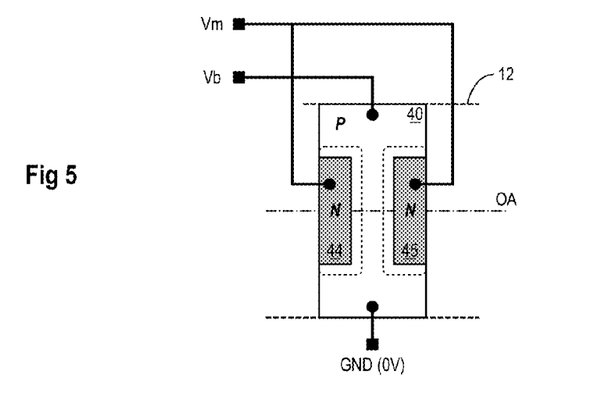
FIG. 5 is a schematic diagram of another embodiment of a pinned phase shifter in accordance with the present invention.

FIG. 5 shows another embodiment of a pinned phase shifter. This embodiment is similar to that of FIG. 4A, except that it lacks the N-type zone 42. In other words, the quiescent current is not established through a junction, but through a zone that is integrally P-doped, and behaves in a purely resistive mode. The quiescent current is no longer a diffusion current, but a conduction current. A conduction current is less effective than a diffusion current in terms of phase shift per unit of current, meaning that the quiescent current may need to be greater for the same initial phase delay. However, this structure has no response lag after a full pinching. Indeed, once the current is canceled in the diode 40-42 of FIG. 4A, the reestablishment of a current is delayed by the fact that the junction must first be charged.

A structure of the type of FIG. 4A may have a length of 250 microns and achieve a sensitivity of about 40°/mm. Thus, to achieve the typically desired amplitude of about 30° for a dynamic phase shifter, three "modules" of the type of FIG. 4A may be placed side by side in a waveguide. A length of about 800 microns is sufficient, compared to 3 mm occupied by a conventional HSPM phase shifter.

Figure 6A:
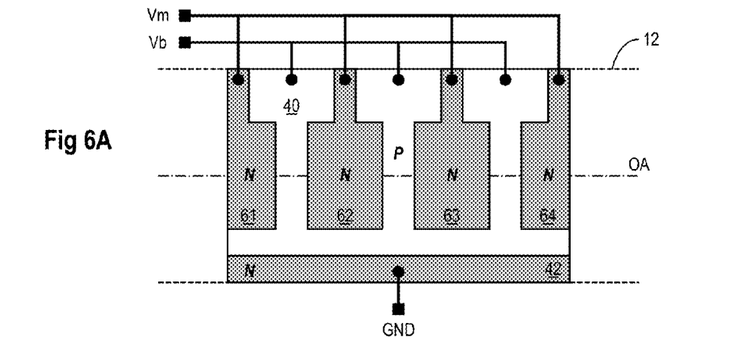
FIGS. 6A and 6B are schematic diagrams of two implementation examples of pinned phase shifters of the type of FIG. 4A in an optical waveguide.

FIG. 6A illustrates a first exemplary structure combining three pinned phase shifter modules of the type of FIG. 4A. The P-type zones 40 of the three modules are interconnected on the south side (the side of terminal GND). The N-type zone 42 is common to all three modules. The current paths of the three modules pass through gaps between four islands 61 to 64 of N conductivity type. Each island comprises an arm extending toward the north edge of the waveguide, where it is connected to terminal Vm, common to the three modules. The north part of the P-type zone 40 is thus separated by the arms in three distinct portions, associated respectively with the three modules. Each of these portions is connected, at the north edge of the waveguide, to terminal Vb, common to the three modules.

In the structure of FIG. 6A, a depletion region forms around each of the islands 61-64. It may be desirable, in order to reduce the capacitance between terminals Vb and Vm, to limit the depletion regions to the areas where they serve to pinch the current paths. In addition, the current flowing out of the pinch paths may tend to distribute along the N-type zone 42. This may lead to diverging behaviors of the modules.

Figure 6B:
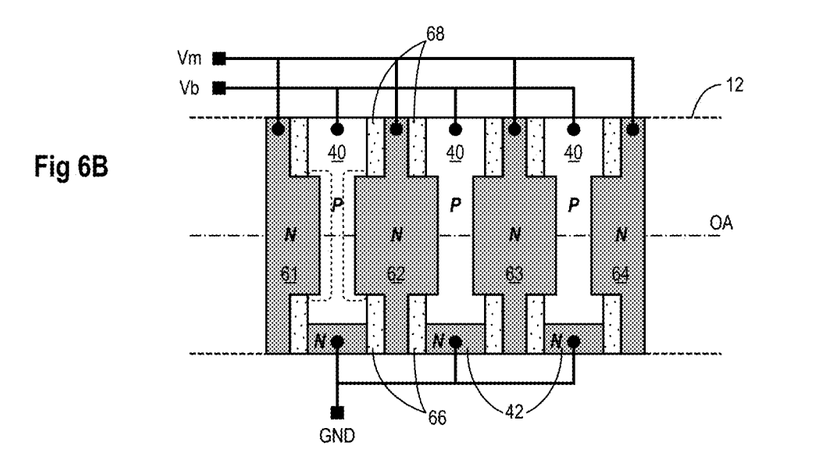

FIG. 6B illustrates another exemplary structure associating three phase shifter modules, which ensures a homogeneous behavior of the modules. The P-type zones 40 of the modules are individualized on the south side by insulating zones 66 that also separate the N-type zone 42 into individual portions.

Insulating zones 68 are also provided on the north side, along the arms of the islands 61 to 64. The insulating zones 66 and 68 thus constrain the formation of the depletion regions to the locations where the pinching action is desired.

As shown, the islands may also include arms extending towards the south of the waveguide, through insulating zones 66. With this configuration, the terminal Vm and its tracks for contacting areas 61-64 may be provided on either side of the waveguide.

A phase shifter as described so far is intended in principle to transmit the two logic values 1 and 0 of a binary signal. The phase shifter is designed to switch abruptly between two phase delay values, for example 0° and 30°, at the rate of the binary signal. (In practice, no phase shifter is capable of introducing a zero phase delay—a phase delay is to be considered as a differential value generated by an MZI modulator. A value of 0° corresponds to the case where each branch introduces the same phase delay.)

Figure 7:
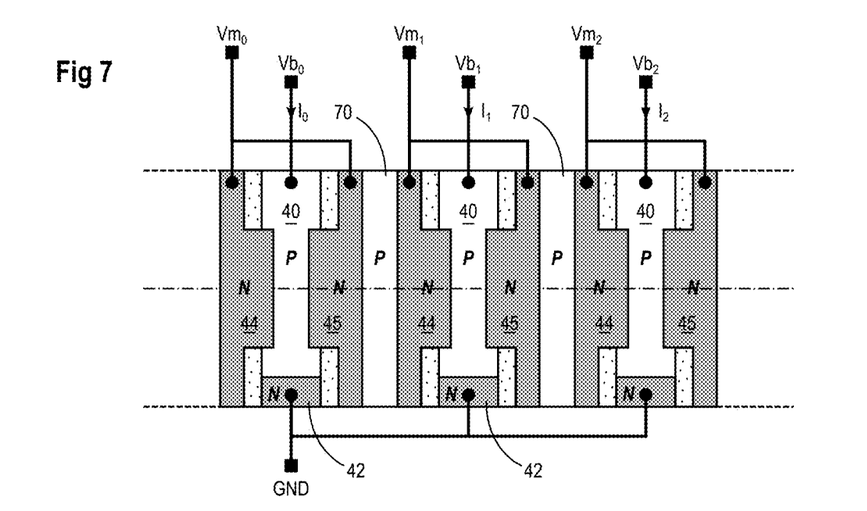
FIG. 7 is a schematic diagram of an exemplary "multilevel" phase shifter achievable with pinned phase shifters in accordance with an embodiment of the present invention.

FIG. 7 shows an exemplary "multilevel" phase shifter achievable from pinned phase shifters of the type of FIG. 4A. Such a phase shifter is designed to translate combinations of a multi-bit digital signal into different phase shift levels. The shown example is adapted to a three-bit digital signal corresponding to eight phase shift levels.

The phase shifter includes three modules of the type of FIG. 4A, independently controllable and isolated from one another by a transverse floating strip 70 of P conductivity type. The structure of each module is similar to that of FIG. 4A. Each of the N-type islands or zones 44 and 45 further comprises two arms extending toward the respective edges of the waveguide. These arms are used to complete the isolation between the modules with the P-type strips 70, creating two opposing junctions between two adjacent modules.

The north arms of the islands 44 and 45 of a same module of rank i are connected to a dedicated modulation terminal $Vm_i$. Furthermore, the north part of the P-type zone 40 of a module of rank i is connected to a dedicated bias terminal $Vb_i$. Each N-type zone 42 may be set back relative to the north arms of islands 44, 45, and the space between the zone 42 and the arms may be filled by P conductivity type portions of zone 40. The zones 42 may be connected to ground GND.

In operation, the bias voltage applied to the terminal $Vb_0$ of the module of rank 0 is selected to establish a quiescent current $I_0$ introducing a phase delay of n/8, for example. The bias voltages $Vb_1$ and $Vb_2$ of the modules of ranks 1 and 2 are then chosen for establishing quiescent currents I1 and I2 introducing phase delays in geometrical progression of factor 2, for example n/4 and n/2.

Three bits M[2:0] of a digital signal to be transmitted are represented by three binary signals $M_0$, $M_1$, $M_2$. Each binary signal $M_i$ may be applied between the terminals Vb, and $Vm_i$ of the corresponding module of rank i, for example by means of a respective transformer (as shown in FIG. 4A). The amplitude of the signal $M_i$ is preferably selected to obtain the cancellation of the quiescent current through total pinching of the current path. This amplitude is substantially independent of the current. Thus, the amplitudes of the signals $M_i$ may be equal. With this configuration, each combination of three bits M[2:0] is translated into a phase delay value proportional to the corresponding digital value.

In principle, no insulation is generally required between the various N and P zones in a same module. Indeed, the junction between each of the zones 44, 45 and the zone 40 is reverse biased, so no current flows between the zones. The only current that may flow is that from the zone 40 to the zone 42, between the terminals Vb and GND. However, if it is desired to limit the extent of the depletion regions, insulating zones may be provided along the arms of islands 44, 45, as in FIG. 6B.

Many variations and modifications of the embodiments described herein will be apparent to the skilled person. The conductivity types of the various described zones correspond to a conductivity type of a native substrate commonly used. The conductivity types may be interchanged without affecting the described operating principles. Phase shifter structures having any number of modules arranged along a waveguide may be designed. The waveguide may be ribbed or flat.

What is claimed is:

1. A method of phase shifting an optical wave in an optical waveguide on a substrate, the method comprising:
    producing a quiescent current flowing parallel to a first bipolar junction and forward biasing a second bipolar junction, the first bipolar junction and the second bipolar junction sharing a first zone; and
    reverse biasing the first bipolar junction using a modulation signal.

2. The method according to claim 1, wherein the first bipolar junction comprises the first zone and a second zone of opposite conductivity; and wherein the second bipolar junction comprises a fourth zone having a same conductivity as the second zone, and shares the second zone.

3. The method according to claim 2, wherein the second bipolar junction extends in a direction transverse to the first bipolar junction.

4. The method according to claim 2, wherein the optical waveguide further comprises a third bipolar junction sharing the first zone with the first and second bipolar junctions and comprising a third zone having a same conductivity as the second zone.

5. The method according to claim 4, further comprising reverse biasing the third bipolar junction using the modulation signal.

6. The method according to claim 4, wherein the third bipolar junction extends in a parallel direction to the first bipolar junction.

7. The method according to claim 1, wherein the optical waveguide defines an optical axis; and wherein the first bipolar junction extends transverse to the optical axis.

8. The method according to claim 1, wherein the optical waveguide defines an optical axis; and wherein the first bipolar junction extends parallel to the optical axis.

9. The method according to claim 1, wherein the producing the quiescent current comprises generating the quiescent current with a static control structure.

10. The method according to claim 1, wherein reverse biasing the first bipolar junction comprises generating the modulation signal with a dynamic control structure.

11. A method of phase shifting an optical wave in an optical waveguide on a substrate and comprising a first bipolar junction and a second bipolar junction sharing a first zone with the first bipolar junction, the method comprising:
    operating a static control structure to produce a quiescent current flowing parallel to the first bipolar junction and forward biasing the second bipolar junction; and
    operating a dynamic control structure coupled to the static control structure to reverse bias the first bipolar junction using a modulation signal.

12. The method according to claim 11, wherein the first bipolar junction comprises the first zone and a second zone of opposite conductivity; and wherein the second bipolar junction comprises a fourth zone having a same conductivity as the second zone, and shares the first zone.

13. The method according to claim 12, wherein the second bipolar junction extends in a direction transverse to the first bipolar junction.

14. The method according to claim 12, wherein the optical waveguide further comprises a third bipolar junction sharing the first zone with the first and second bipolar junctions and comprising a third zone having a same conductivity as the second zone.

15. The method according to claim 14, further comprising reverse biasing the third bipolar junction using the modulation signal.

16. The method according to claim 14, wherein the third bipolar junction extends in a parallel direction to the first bipolar junction.

17. The method according to claim 11, wherein the optical waveguide defines an optical axis; and wherein the first bipolar junction extends transverse to the optical axis.

18. The method according to claim 11, wherein the optical waveguide defines an optical axis; and wherein first bipolar junction extends parallel to the optical axis.

19. A method for making a phase shifter for an optical wave in an optical waveguide on a substrate comprising:
    forming a first bipolar junction and a second bipolar junction in the optical waveguide so that the first and second bipolar junctions share a first zone;
    coupling a static control structure to produce a quiescent current flowing parallel to the first bipolar junction and to forward bias the second bipolar junction; and
    coupling a dynamic control structure to reverse bias the first bipolar junction using a modulation signal.

20. The method according to claim 19, wherein the first bipolar junction comprises the first zone and a second zone of opposite conductivity; and wherein the second bipolar junction comprises a fourth zone having a same conductivity as the second zone, and shares the first zone.

21. The method according to claim 20, wherein the second bipolar junction extends in a direction transverse to the first bipolar junction.

22. The method according to claim 20, further comprising forming a third bipolar junction sharing the first zone with the first and second bipolar junctions and comprising a third zone having a same conductivity as the second zone.

23. The method according to claim 22, wherein the third bipolar junction extends in a parallel direction to the first bipolar junction.

24. The method according to claim 19, wherein the optical waveguide defines an optical axis; and wherein first bipolar junction extends transverse to the optical axis.

25. The method according to claim 19, wherein the optical waveguide defines an optical axis; and wherein the first bipolar junction extends parallel to the optical axis.

26. A method of operating a photonic circuit, the method comprising:
    using a modulation signal, applying a reverse bias to a first p/n junction formed between a first zone and a second zone, the reverse bias depleting a portion of the first zone; and
    applying a forward bias to a second p/n junction formed between the first zone and a third zone to generate a current through the first zone and the second p/n junction, the reverse bias controlling an amount of the current.

27. The method according to claim 26, wherein the photonic circuit comprises an optical waveguide having an optical axis, and wherein the first p/n junction extends transverse to the optical axis.

28. The method according to claim 26, wherein the photonic circuit comprises an optical waveguide having an optical axis, and wherein the first p/n junction extends parallel to the optical axis.

29. The method according to claim 26, wherein the current is generated using a static control structure.

30. The method according to claim 1, further comprising generating the modulation signal with a dynamic control structure.

\* \* \* \* \*

UNITED STATES PATENT AND TRADEMARK OFFICE
CERTIFICATE OF CORRECTION

| | |
|---|---|
| PATENT NO. | : 9,971,173 B2 |
| APPLICATION NO. | : 15/251236 |
| DATED | : May 15, 2018 |
| INVENTOR(S) | : Jean-Robert Manouvrier |

It is certified that error appears in the above-identified patent and that said Letters Patent is hereby corrected as shown below:

In the Claims

In Column 7, Line 31, Claim 2, delete "as the second zone, and shares the second zone" and insert --as the second zone, and shares the first zone--.

Signed and Sealed this
Seventeenth Day of July, 2018

Andrei Iancu
*Director of the United States Patent and Trademark Office*